United States Patent
Yamasaki et al.

(10) Patent No.: US 11,458,545 B2
(45) Date of Patent: Oct. 4, 2022

(54) CUTTING INSERT AND CUTTING TOOL

(71) Applicant: KYOCERA CORPORATION, Kyoto (JP)

(72) Inventors: Tsuyoshi Yamasaki, Satsumasendai (JP); Yoshiki Sakamoto, Hioki (JP)

(73) Assignee: KYOCERA Corporation, Kyoto (JP)

( * ) Notice: Subject to any disclaimer, the term of this patent is extended or adjusted under 35 U.S.C. 154(b) by 301 days.

(21) Appl. No.: 16/499,339

(22) PCT Filed: Mar. 22, 2018

(86) PCT No.: PCT/JP2018/011480
§ 371 (c)(1),
(2) Date: Sep. 30, 2019

(87) PCT Pub. No.: WO2018/180911
PCT Pub. Date: Oct. 4, 2018

(65) Prior Publication Data
US 2020/0047257 A1 Feb. 13, 2020

(30) Foreign Application Priority Data

Mar. 30, 2017 (JP) .............................. JP2017-066749

(51) Int. Cl.
*B23B 27/16* (2006.01)
*B23C 5/10* (2006.01)

(52) U.S. Cl.
CPC .......... *B23B 27/1603* (2013.01); *B23C 5/109* (2013.01)

(58) Field of Classification Search
CPC .............. B23B 2222/92; B23B 27/148; B23C 2222/28; B23C 5/109
See application file for complete search history.

(56) References Cited

U.S. PATENT DOCUMENTS

| 6,294,129 | B1 | 9/2001 | Waldenstroem |
| 2016/0136735 | A1 | 5/2016 | Matsuda et al. |
| 2019/0061011 | A1* | 2/2019 | Nomiyama ........... B23B 27/148 |

FOREIGN PATENT DOCUMENTS

| JP | H06220571 A | 8/1994 |
| JP | H07252579 A | 10/1995 |
| JP | 2000204424 A | 7/2000 |
| JP | 2008284637 A | 11/2008 |
| JP | 2015208807 A | 11/2015 |

* cited by examiner

*Primary Examiner* — Alan Snyder
(74) *Attorney, Agent, or Firm* — Viering, Jentschura & Partner mbB

(57) ABSTRACT

A cutting insert may include a base member including a plurality of tungsten carbide particles. In cases where a particle diameter distribution of the tungsten carbide particles is measured at intervals of 0.025 μm, the particle diameter distribution may include, as a maximum peak and a second peak, a first peak value that appears in a particle diameter range of 0.5-0.9 μm, and a second peak value that appears in a particle diameter range of 1.1-1.5 μm. A value of a particle diameter distribution frequency is larger than zero at a valley part where a value of the particle diameter distribution frequency reaches a minimum between the first peak value and the second peak value.

5 Claims, 4 Drawing Sheets

CUTTING INSERT AND CUTTING TOOL

CROSS-REFERENCE TO RELATED APPLICATIONS

This application is a national stage entry according to 35 U.S.C. 371 of PCT Application No. PCT/JP2018/011480 filed on Mar. 22, 2018, which claims priority to Japanese Application No. 2017-066749 filed on Mar. 30, 2017, which are entirely incorporated herein by reference.

TECHNICAL FIELD

The present disclosure relates to a cutting insert for use in a cutting process.

BACKGROUND

A cutting insert may be used in a cutting process, such as a turning process and a milling process. Some cutting inserts may be composed of cemented carbide including tungsten carbide (WC) particles as discussed in Patent Documents 1 (Patent Document 1: Japanese Unexamined Patent Publication No. 6-220571) and 2 (Patent Document 2: Japanese Unexamined Patent Publication No. 2000-204424). The cutting inserts discussed in Patent Documents 1 and 2 may be composed of cemented carbide consisting of a group in which WC particles include a relatively small particle diameter (a first group), and a group in which WC particles include a relatively large particle diameter (a second group). Attempts to enhance strength (bending strength) by the first group and toughness (fracture toughness) by the second group may be made in Patent Documents 1 and 2.

A particle diameter distribution of one of the above two groups is not overlapped with that of the other in the cutting inserts discussed in Patent Documents 1 and 2. Specifically, the first group and the second group respectively include peak values independent of each other, and include no WC particles whose particle diameter is intermediate between those of the first group and the second group. It is therefore difficult to have the effect of enhancing the strength by the first group and the effect of enhancing the toughness by the second group. Hence, there still remains a problem of enhancement in both strength and toughness.

SUMMARY

In a non-limiting embodiment, a cutting insert may include a base member including a plurality of tungsten carbide particles. In cases where a particle diameter distribution of the tungsten carbide particles is measured at intervals of 0.025 μm, the particle diameter distribution may include, as a maximum peak and a second peak, a first peak value that appears in a particle diameter range of 0.5-0.9 μm, and a second peak value that appears in a particle diameter range of 1.1-1.5 μm. A value of the particle diameter distribution may be larger than zero at a valley part where the particle diameter distribution reaches a minimum between the first peak value and the second peak value.

DETAILED DESCRIPTION

Figure 1:
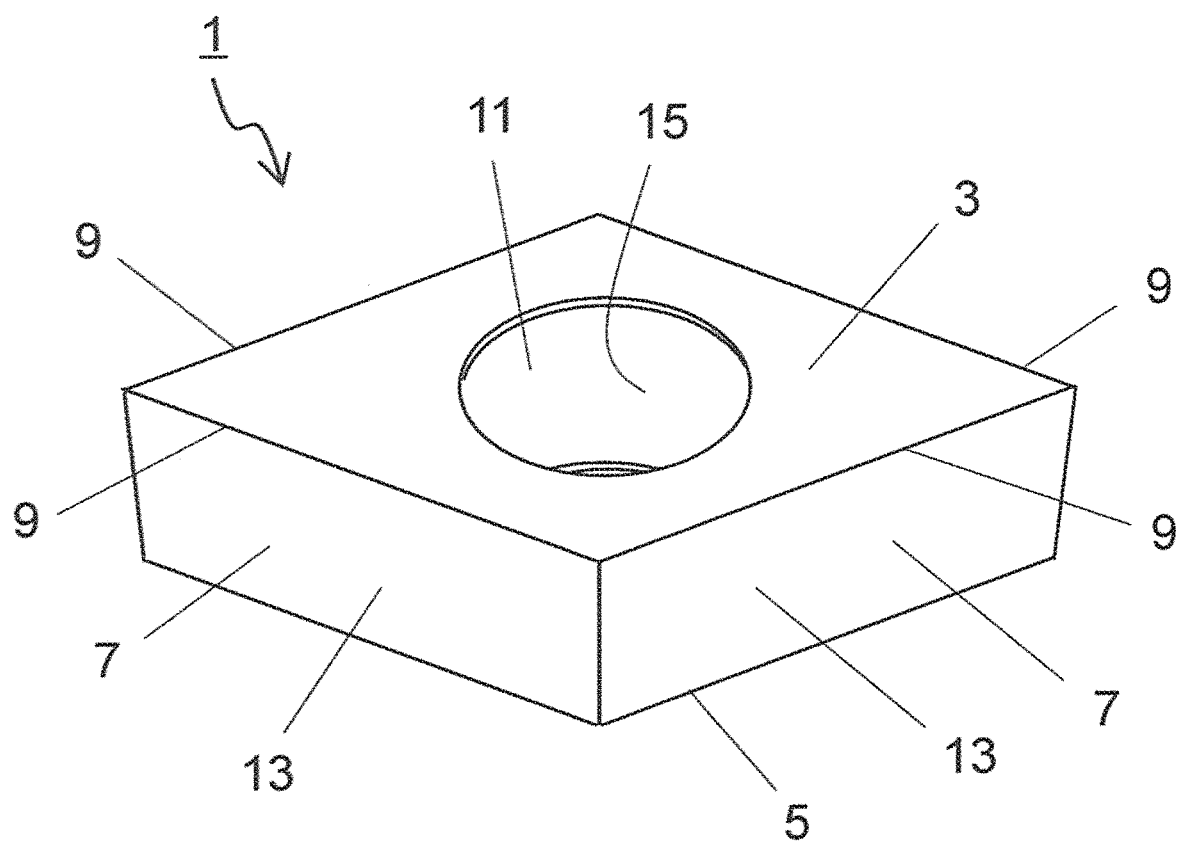
FIG. 1 is a perspective view illustrating a cutting insert according to a non-limiting embodiment.

A cutting insert 1 (hereinafter also referred to simply as an "insert 1") is described in detail below with reference to the drawings. For the sake of description, the drawings referred to in the following illustrate, in a simplified form, only main members necessary for describing various non-limiting embodiments. The insert 1 is therefore capable of including any arbitrary structural member not illustrated in the drawings referred to. Sizes of the members in each of the drawings do not faithfully represent sizes of actual structural members and dimension ratios of these members.

The insert 1 according to a non-limiting embodiment includes a first surface 3 (an upper surface in FIG. 1), a second surface 5 (a lower surface in FIG. 1) located on an opposite side of the first surface 3, and a third surface 7 (a surface (side surface) between the upper surface and the lower surface in FIG. 1). The first surface 3 and the second surface 5 include a quadrangular shape, and the insert 1 includes a quadrangular plate shape according to a non-limiting embodiment.

The third surface 7 intersects with each of the first surface 3 and the second surface 5. A cutting edge 9 is located on at least a part of a ridge line where these surfaces intersect with each other. The entirety of the ridge line where the first surface 3 intersects with the third surface 7 serves as the cutting edge 9 according to a non-limiting embodiment. For example, the entirety of the ridge line where the first surface 3 intersects with the third surface 7 may serve as the cutting edge 9. Alternatively, the entirety of the ridge line where the second surface 5 intersects with the third surface 7 may serve as the cutting edge 9. In other words, the third surface 7 connects to each of the first surface 3 and the second surface 5 by interposing the ridge line therebetween.

The cutting edge 9 is a part usable for cutting out a workpiece in a cutting process. Therefore, one of the two surfaces constituting the ridge line where the cutting edge 9 is located includes a rake surface region, and the other includes a flank surface region. The term "rake surface region" denotes a region that serves to control a chip flow by bringing chips generated by the cutting edge 9 during the cutting process into contact with the region.

The first surface 3 includes the rake surface region, and the third surface 7 includes the flank surface region according to a non-limiting embodiment. More specifically, a partial region along the cutting edge 9 on the first surface 3 serves as the rake surface region. A partial region along the cutting edge 9 on the second surface 5 serves as the flank surface region. The rake surface region need not correspond to the entirety of the first surface 3. There is no problem even if only a part of the first surface 3 corresponds to the rake surface region.

As illustrated in FIG. 1, the insert 1 includes the base member 11 having the quadrangular plate shape, and a coating layer 13 that covers a surface of the base member 11. The coating layer 13 may not be required, and the insert 1 may be composed only of the base member 11. Even if including the coating layer 13, a thickness of the coating layer 13 is sufficiently small in comparison with the size of the insert 1. Accordingly, the shape and size of the base member 11 substantially almost coincide with the shape and size of the insert 1.

The base member 11 includes a plurality of tungsten carbide (WC) particles according to a non-limiting embodiment. In cases where a particle diameter distribution frequency of tungsten carbide particles is measured and evaluated at intervals of 0.025 μm, a particle diameter distribution includes, as a maximum peak and a second peak, a first peak $P_1$ that appears in a particle diameter range of 0.5-0.9 μm, and a second peak $P_2$ that appears in a particle diameter range of 1.1-1.5 μm according to a non-limiting embodiment.

Because the particle diameter distribution includes the above configuration instead of a configuration merely including only a single peak value, tungsten carbide particles (first particles) that include a relatively small and are capable of enhancing strength, and tungsten carbide particles (second particles) that include a relatively large particle diameter and are capable of enhancing toughness respectively include a high distribution peak.

Furthermore, the particle diameter distribution includes such a configuration that the first peak is continuous with the second peak, instead of such a configuration that particles having a relatively small particle diameter and particles having a relatively large particle diameter respectively include two peaks independent of each other as a maximum peak and a second peak. Specifically, the value of the particle diameter distribution frequency is not zero but a value larger than zero even at the valley part where the value of the particle diameter distribution frequency reaches a minimum between the first peak value $P_1$ and the second peak value $P_2$. Accordingly, the number of particles being intermediate in size between the first particles and the second particles can be ensured even at the valley part. It is therefore easy to combine the effect of enhancing the strength by the first particles and the effect of enhancing the toughness by the second particles. This contributes to enhancing both strength and toughness of the base member 11.

In particular, if the value of the particle diameter distribution frequency at the valley part is a half or more of each of the first peak value $P_1$ and the second peak value $P_2$, it becomes easier to combine the effect of enhancing the strength by the first particles and the effect of enhancing the toughness by the second particles. This contributes to further enhancing both the strength and toughness of the base member 11.

Figure 2:
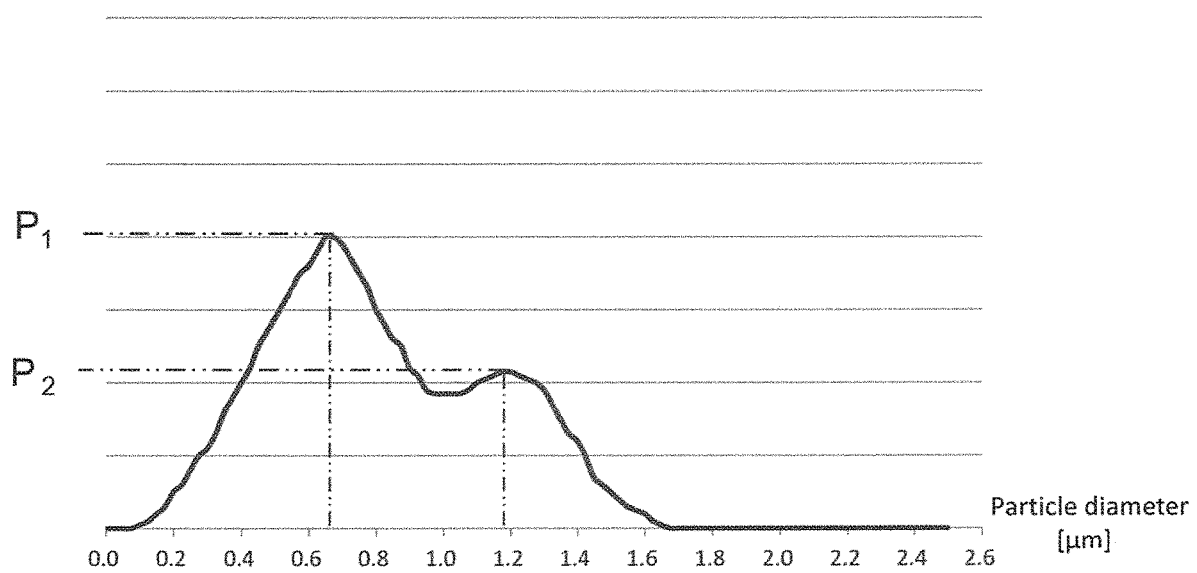
FIG. 2 is a diagram illustrating a particle diameter distribution of tungsten carbide particles within a base member in the cutting insert according to a non-limiting embodiment.

If a particle diameter corresponding to the first peak value $P_1$ is taken as a particle diameter $A_1$ of the first particles and a particle diameter corresponding to the second peak value $P_2$ is taken as a particle diameter $A_2$ of the second particles, the particle diameter $A_1$ of the first particles is 0.65 μm and the particle diameter $A_2$ of the second particles is 1.2 μm according to a non-limiting embodiment illustrated in FIG. 2. The particle diameter $A_2$ of the second particles is larger than the particle diameter $A_1$ of the first particles according to a non-limiting embodiment.

The strength of the insert 1 can be kept high if the particle diameter $A_1$ of the first particles is 0.5-0.9 μm. Although the particle diameter $A_2$ of the second particles is not limited to a specific value, the toughness of the insert 1 can be kept high if it is 1.1-1.5 μm.

A distribution quantity is indicated by a ratio of a particle number to a total number of tungsten carbide particles in FIG. 2. The first peak value $P_1$ that is a distribution quantity at the particle diameter $A_1$ of the first particles is 4%, and the second peak value $P_2$ that is a distribution quantity at the particle diameter $A_2$ of the second particles is 2.2%.

A ratio of the second peak value $P_2$ to the first peak value $P_1$ is not particularly limited. The first peak value $P_1$ may be larger than the second peak value $P_2$ as in the non-limiting embodiment illustrated in FIG. 2. Alternatively, the second peak value $P_2$ may be larger than the first peak value $P_1$ as in the non-limiting embodiment illustrated in FIG. 3.

The strength of the base member 11 can be particularly enhanced if the first peak value $P_1$ is larger than the second peak value $P_2$ as in the non-limiting embodiment illustrated in FIG. 2. Because the particle diameter $A_1$ of the first particles is smaller than the particle diameter $A_2$ of the second particles, a content ratio of particles having a relatively small particle diameter can be enhanced, thereby making it possible to enhance volume density of the tungsten carbide in the base member 11.

In particular, durability of the insert 1 can be enhanced because the second peak value $P_2$ is smaller than the first peak value $P_1$ if the insert 1 includes the coating layer 13. In general, if an insert includes a coating layer on a base member, a crack may occur in the base member due to a difference in thermal expansion coefficient between the base member and the coating layer. However, if the second peak value $P_2$ is smaller than the first peak value $P_1$, a distribution quantity of the second particles having a relatively large particle diameter is small and the toughness can be enhanced, leading to slow growth of the crack. This contributes to enhancing the durability of the insert 1.

Even in the above case, the ratio of the first peak value $P_1$ to the second peak value $P_2$ ($P_1/P_2$) may be 2 or less in order to ensure the effect of enhancing the toughness by the second particles according to a non-limiting embodiment.

Figure 3:
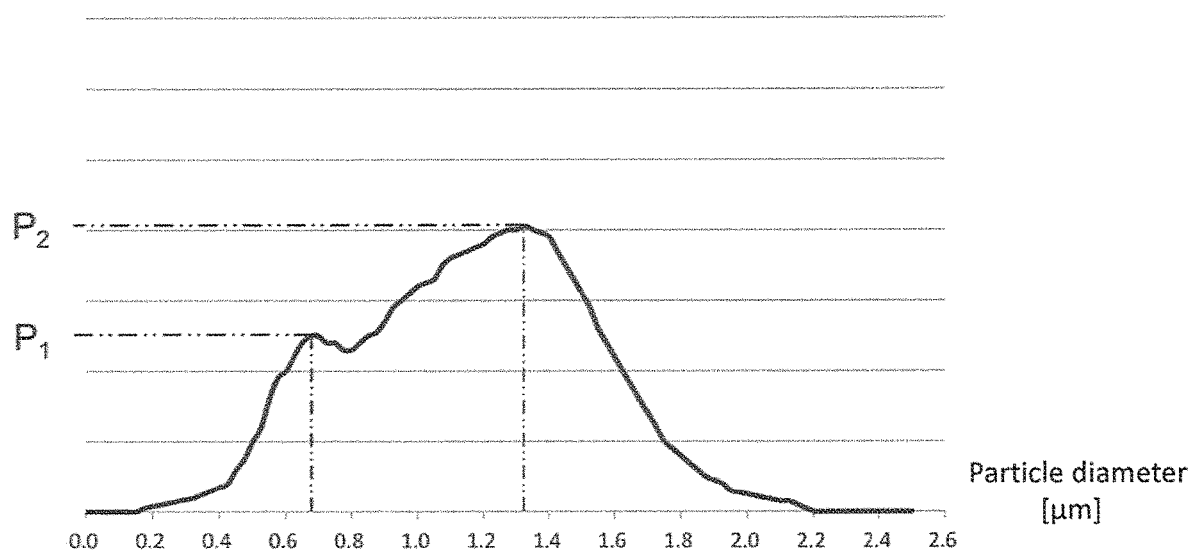
FIG. 3 is a diagram illustrating a particle diameter distribution of tungsten carbide particles within a base member according to a non-limiting embodiment.

If the second peak value $P_2$ is larger than the first peak value $P_1$ as in the non-limiting embodiment illustrated in FIG. 3, there is a high content of particles having a large particle diameter, resulting in a large mean particle diameter of tungsten carbide particles included in the base member 11. In this case, a cutting edge is less susceptible to damage due to a thermal factor during a cutting process.

Even in the above case, the ratio of the second peak value $P_2$ to the first peak value $P_1$ ($P_2/P_1$) may be 2 or less in order to ensure the effect of enhancing the strength by the first particles in a non-limiting embodiment.

Both strength and toughness can be further enhanced if δA is smaller than the particle diameter $A_1$ of the first particles where δA is a difference between the particle diameter $A_2$ of the second particles and the particle diameter $A_1$ of the first particles. The particle diameter distribution includes the first peak value $P_1$ and the second peak value $P_2$ according to a non-limiting embodiment. The effect of enhancing the toughness can be ensured by avoiding that the particle diameter $A_1$ of the first particles and the particle diameter $A_2$ of the second particles become excessively small. Relatively small peak value and quasi peak value are avoidable by avoiding an excessively large δA. Specifically, both strength and toughness can be further enhanced if a ratio of δA to the particle diameter $A_1$ of the first particles (δA/$A_1$) is 1 or more.

The base member 11 includes a metallic component, such as cobalt, in addition to the tungsten carbide particles according to a non-limiting embodiment. The metallic component serves to join the tungsten carbide particles together and is generally referred to as a binding phase. The binding phase may include only cobalt or, alternatively, may include a metallic component, such as chrome (Cr), in addition to cobalt.

The metallic component is thus referred to as the binding phase, while the tungsten carbide particles in the base member 11 is referred to as a hard phase. The hard phase is not limited to the tungsten carbide. The hard phase may include particles composed of a component, such as vanadium carbide (VC), titanium carbide (TiC), tantalum carbide (TaC) or niobium carbide (NbC), in addition to tungsten carbide particles.

Examples of materials of the coating layer 13 includes carbide, nitride, oxide, carbon oxide, nitrogen oxide, carbonitride, and oxycarbonitride of titanium. The coating layer 13 may include only one or a plurality of kinds of the above materials. The coating layer 13 may be composed only of a single layer or, alternatively, may be a laminate composed of a plurality of laminated layers. The coating layer 13 can be located on the base member 11 by using chemical vapor deposition (CVD) method or physical vapor deposition (PVD) method.

Although the insert 1 includes the quadrangular plate shape as illustrated in FIG. 1 according to a non-limiting embodiment, the shape of the insert 1 is not limited thereto. For example, there is no problem if the upper surface includes a triangular, hexagonal or circular shape instead of a quadrangular shape.

The insert 1 includes a through hole 15 as illustrated in FIG. 1 according to a non-limiting embodiment. The through hole 15 extends from the first surface 3 to the second surface 5, and opens into these surfaces according to a non-limiting embodiment. The through hole 15 is usable for attaching a screw or clamping member when causing the insert 1 to be held by a holder. There is no problem if the through hole 15 is configured to open into regions located opposite each other on the third surface 7.

A method for manufacturing the insert 1 according to a non-limiting embodiment is described below.

The first step is to prepare powders of inorganic materials that are raw materials of the base member 11. First particles having a mean particle diameter of 0.1-1 μm and second particles having a mean particle diameter of 0.6-2 μm are prepared as powders of tungsten carbide particles. Although the mean particle diameter of the second particles is larger than the mean particle diameter of the first particles, a particle diameter distribution of the first particles is overlapped with a particle diameter distribution of the second particles.

Powders of vanadium carbide and chrome carbide in addition of tungsten carbide are prepared as components of a hard phase. Powder of metal cobalt is prepared as a binding phase. The above inorganic material powders are mixed together in such a ratio that vanadium carbide is 0.05-0.2 mass %, chrome carbide is 0.1-1 mass %, metal cobalt is 4-20 mass %, and the first particles and the second particles that are the tungsten carbide particles correspond to a mass % of the rest. A mixed powder is manufactured by suitably adding carbon powder and a binder to the above mixture and then by mixing them together. Here, ratios of the first particles and the second particles are set as follows. The first particles and the second particles are mixed together so that the ratio of the first particles to the second particles is approximately 0.5-5.

Subsequently, a molded body is obtained by molding the above mixed powder into a predetermined tool shape by using a well-known molding method, such as press molding, casting, extrusion molding, or cold isostatic press molding.

Thereafter, the base member 11 is manufactured by sintering the molded body in vacuum or in a non-oxidizing atmosphere. A grinding process or honing process is applied to a surface of the manufactured base member 11. The grinding process and the honing process may be omitted if unnecessary.

Conditions of the sintering differ depending on a size of the molded body and a content of the binder. The sintering is carried out, for example, in vacuum of 0.01 Pa at a temperature of 1400-1600° C. for approximately 1-2 hours.

Thereafter, the insert 1 including the base member 11 and the coating layer 13 is manufactured by coating the surface of the manufactured base member 11 with a titanium compound by using chemical vapor deposition or physical vapor deposition. The insert 1 including only the base member 11 is manufacturable if the step of coating is omitted.

A cutting tool 101 according to a non-limiting embodiment is described below with reference to the drawings.

Figure 4:
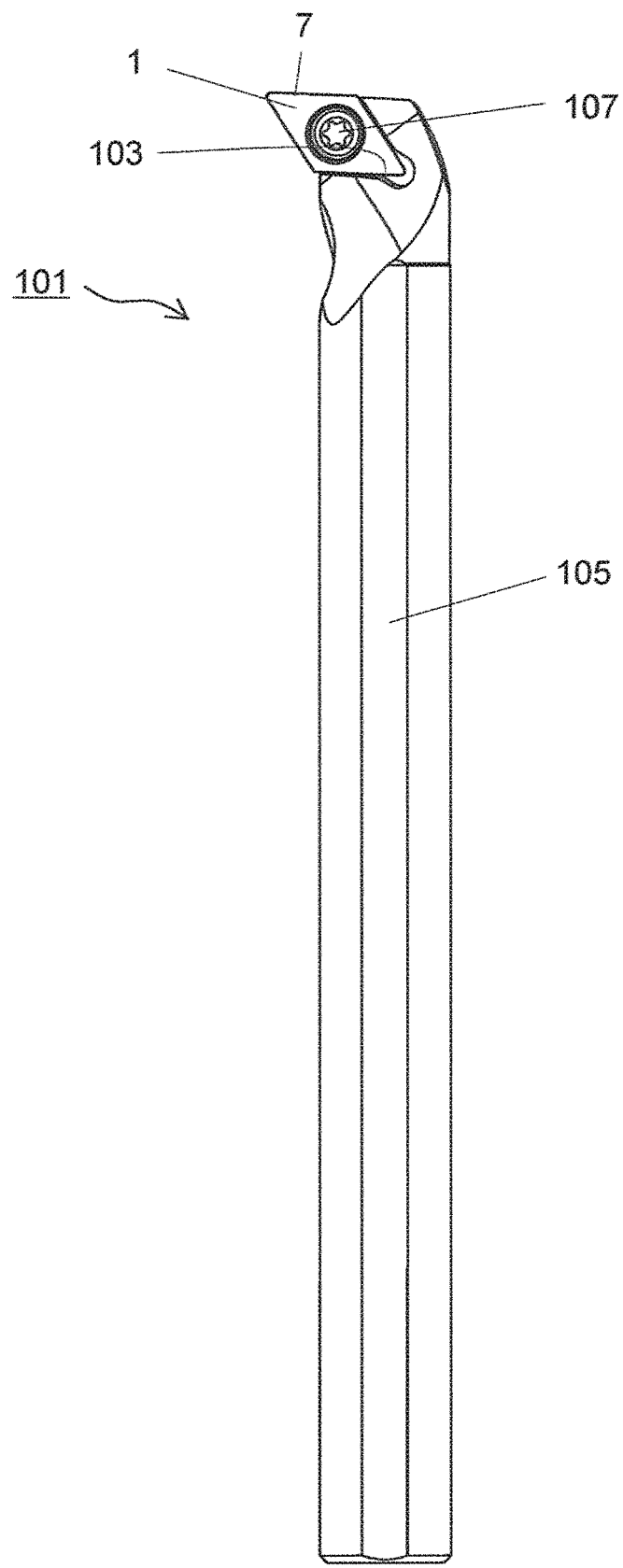
FIG. 4 is a perspective view illustrating a cutting tool according to a non-limiting embodiment.

As illustrated in FIG. 4, the cutting tool 101 of the present non-limiting embodiment is a bar-shaped body extending from a first end (an upper end in FIG. 4) to a second end (a lower end in FIG. 4). The cutting tool 101 includes a holder 105 including a pocket 103 at a side of the first end, and the insert 1 located at the pocket 103.

The pocket 103 is a portion to which the insert 1 is attached. The pocket 103 includes a seating surface parallel to a lower surface of the holder 105, and a constraining side surface being inclined relative to the seating surface. The pocket 103 opens at a side of the first end of the holder 105.

The insert 1 is located at the pocket 103. The lower surface of the insert 1 may be directly contacted with the pocket 103. Alternatively, a sheet may be held between the insert 1 and the pocket 103.

The insert 1 is attached so that a part of the ridge line where the first surface intersects with the third surface which serves as the cutting edge 9 is protruded outward from the holder 105. The insert 1 is attached to the holder 105 by a fixing screw 107 in the present non-limiting embodiment. Specifically, screw portions are screwed together by inserting the fixing screw 107 into the through hole of the insert 1, and by inserting a front end of the fixing screw 107 into a screw hole (not illustrated) formed in the pocket 103.

For example, steel or cast iron is usable for the holder 105. Of these materials, high toughness steel may be used.

The present non-limiting embodiment illustrates and describes the cutting tool used in a so-called turning process. Examples of the turning process include inner diameter machining, outer diameter machining, and grooving process. The cutting tool is not limited to ones which are usable in the turning processes. For example, the insert 1 of the foregoing non-limiting embodiment may be applied to cutting tools usable in a milling process.

Although the non-limiting embodiments in the present disclosure have been illustrated and described above, the present disclosure may not be limited thereto. It is, of course, possible to make any optional ones insofar as they do not depart from the gist of the present disclosure.

DESCRIPTION OF THE REFERENCE NUMERALS 1 insert (cutting insert)
3 first surface
5 second surface
7 third surface
9 cutting edge
11 base member
13 coating layer
15 through hole
101 cutting tool 103 pocket
105 holder
107 fixing screw
$A_1$ particle diameter of first particles
$A_2$ particle diameter of second particles
$P_1$ first peak value
$P_2$ second peak value

What is claimed is:

1. A cutting insert, comprising:
 a base member comprising a plurality of tungsten carbide particles,
 wherein
  the plurality of tungsten carbide particles follow a particle diameter distribution with the tungsten carbide particles measured at intervals of 0.025 μm, and the particle diameter distribution comprises, as a maximum peak and a second peak, a first peak value that appears in a particle diameter range of 0.5-0.9 μm, and a second peak value that appears in a particle diameter range of 1.1-1.5 μm, and a value of a particle diameter distribution frequency is larger than zero at a valley part where a value of the particle diameter distribution frequency reaches a local minimum between the first peak value and the second peak value.

2. The cutting insert according to claim 1, wherein the value of the particle diameter distribution frequency at the valley part is a half or more of each of the first peak value and the second peak value.

3. The cutting insert according to claim 1, wherein $P_1$ is larger than $P_2$ wherein the $P_1$ is the first peak value and the $P_2$ is the second peak value.

4. The cutting insert according to claim 3, wherein a ratio of the $P_1$ to the $P_2$ ($P_1/P_2$) is 2 or less.

5. A cutting tool, comprising:
 a holder comprising a pocket at a side of a front end of the holder; and
 a cutting insert according to claim 1, the cutting insert being located at the pocket.

* * * * *